(12) United States Patent
Yoshida et al.

(10) Patent No.: US 11,860,264 B2
(45) Date of Patent: Jan. 2, 2024

(54) RANGING APPARATUS, RANGING SYSTEM AND RANGING METHOD

(71) Applicants: Kabushiki Kaisha Toshiba, Tokyo (JP); Toshiba Electronic Devices & Storage Corporation, Tokyo (JP)

(72) Inventors: Hiroshi Yoshida, Yokohama Kanagawa (JP); Masaki Nishikawa, Yokohama Kanagawa (JP); Shoji Ootaka, Yokohama Kanagawa (JP); Katsuya Nonin, Kawasaki Kanagawa (JP); Masayoshi Oshiro, Ota Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 274 days.

(21) Appl. No.: 17/005,840

(22) Filed: Aug. 28, 2020

(65) Prior Publication Data

US 2021/0286065 A1 Sep. 16, 2021

(30) Foreign Application Priority Data

Mar. 16, 2020 (JP) .................... 2020-045182

(51) Int. Cl.
*G01S 13/36* (2006.01)
*G01S 13/84* (2006.01)
*G01S 13/78* (2006.01)

(52) U.S. Cl.
CPC .............. *G01S 13/36* (2013.01); *G01S 13/84* (2013.01); *G01S 13/788* (2013.01)

(58) Field of Classification Search
CPC ......... G01S 13/36; G01S 13/84; G01S 13/788
See application file for complete search history.

(56) References Cited

U.S. PATENT DOCUMENTS

2002/0075974 A1* 6/2002 Mill .................. H04L 27/14
375/343
2002/0094786 A1* 7/2002 Berliner ............. H04B 1/7156
455/260

(Continued)

FOREIGN PATENT DOCUMENTS

EP 585087 A1 * 3/1994 ........... H04B 10/272
JP 2017-513024 A 5/2017

(Continued)

OTHER PUBLICATIONS

Gray, Donald J., "A New Method of Teletype Modulation," Sep. 22, 1952, Massachusetts Institute of Technology, Technical Report N. 9, p. 1. (Year: 1952).*

(Continued)

*Primary Examiner* — Nabil H Syed
*Assistant Examiner* — Cal J Eustaquio
(74) *Attorney, Agent, or Firm* — Allen & Overy LLP

(57) ABSTRACT

A ranging apparatus of an embodiment is a ranging apparatus adopting communication type ranging by a phase detection scheme. The ranging apparatus including: a transmitting circuit configured to be able to transmit by a plurality of channels used for data communication and configured to transmit a transmission signal obtained by modulating transmission data; and a control circuit configured to control the transmission circuit to cause a plurality of continuous waves having mutually different frequencies to be generated in a same channel as continuous waves used for ranging by the phase detection scheme.

5 Claims, 6 Drawing Sheets

(56) References Cited

U.S. PATENT DOCUMENTS

| | | |
|---|---|---|
| 2017/0176583 A1 | 6/2017 | Gulden et al. |
| 2018/0267154 A1 | 9/2018 | Dotaka et al. |
| 2019/0079179 A1 | 3/2019 | Kitamura |

FOREIGN PATENT DOCUMENTS

| | | |
|---|---|---|
| JP | 2017-166998 A | 9/2017 |
| JP | 6323298 B2 | 5/2018 |
| JP | 2018-155724 A | 10/2018 |
| JP | 6701124 B2 | 5/2020 |

OTHER PUBLICATIONS

Rouse. What is a Guardband? Dec. 2011, Technopedia, pp. 1-10. (Year: 2011).*

* cited by examiner

RANGING APPARATUS, RANGING SYSTEM AND RANGING METHOD

CROSS REFERENCE TO RELATED APPLICATION

This application is based upon and claims the benefit of priority from the prior Japanese Patent Application No. 2020-045182 filed in Japan on Mar. 16, 2020; the entire contents of which are incorporated herein by reference.

FIELD

An embodiment described herein relates generally to a ranging apparatus, a ranging system and a ranging method.

BACKGROUND

Conventionally, there have been a time detection scheme, a frequency difference detection scheme, a phase detection scheme and the like as ranging schemes. Due to simplicity of implementation, a ranging system adopting a communication-type phase detection scheme in which a distance between apparatuses is determined by communication between the apparatuses is attracting attention.

It is conceivable to incorporate such a ranging system into a data communication device adopted in a mobile terminal and the like. However, when a circuit for data communication and a circuit for ranging are combined, a circuit scale is increased.

Further, in the case of transmitting a signal for ranging, using a channel used for data communication, there is a drawback that a measurable distance is short because, in general, a channel spacing used for data communication is relatively large.

DETAILED DESCRIPTION

A ranging apparatus of an embodiment is a ranging apparatus adopting communication type ranging by a phase detection scheme, the ranging apparatus including: a transmitting circuit configured to be able to transmit by a plurality of channels used for data communication and configured to transmit a transmission signal obtained by modulating transmission data; and a control circuit configured to cause a plurality of continuous waves having mutually different frequencies in a same channel to be generated as continuous waves used for ranging by the phase detection scheme.

An embodiment of the present invention will be described in detail below with reference to drawings.

Embodiment

Figure 1:
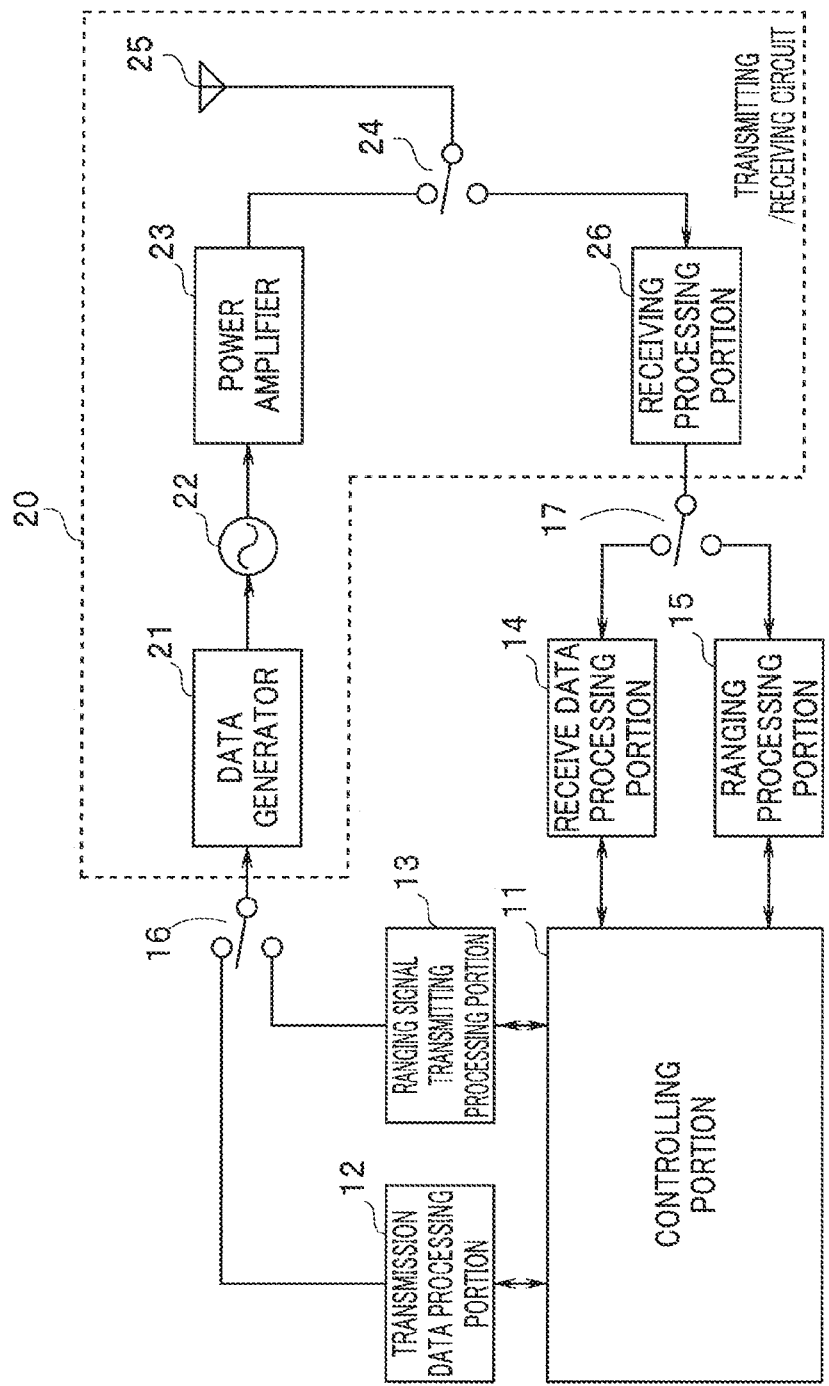
FIG. 1 is a block diagram showing a ranging apparatus according to an embodiment of the present invention.

FIG. 1 is a block diagram showing a ranging apparatus according to an embodiment of the present invention. The ranging apparatus in the present embodiment also serves as a data communication apparatus adopting FSK (frequency shift keying) modulation and is in a configuration in which a transmitting/receiving circuit is shared between a circuit portion for ranging and a circuit portion for data communication. Further, in the present embodiment, a plurality of CWs (continuous waves) in a band in one channel among transmission channels used for data communication are used for ranging, so that ranging for a relatively long distance is made possible.

In the present embodiment, an example will be described in which a phase detection scheme using CWs which are unmodulated carriers is adopted, and communication-type ranging in which a distance between apparatuses is determined by communication is adopted.

Figure 2:
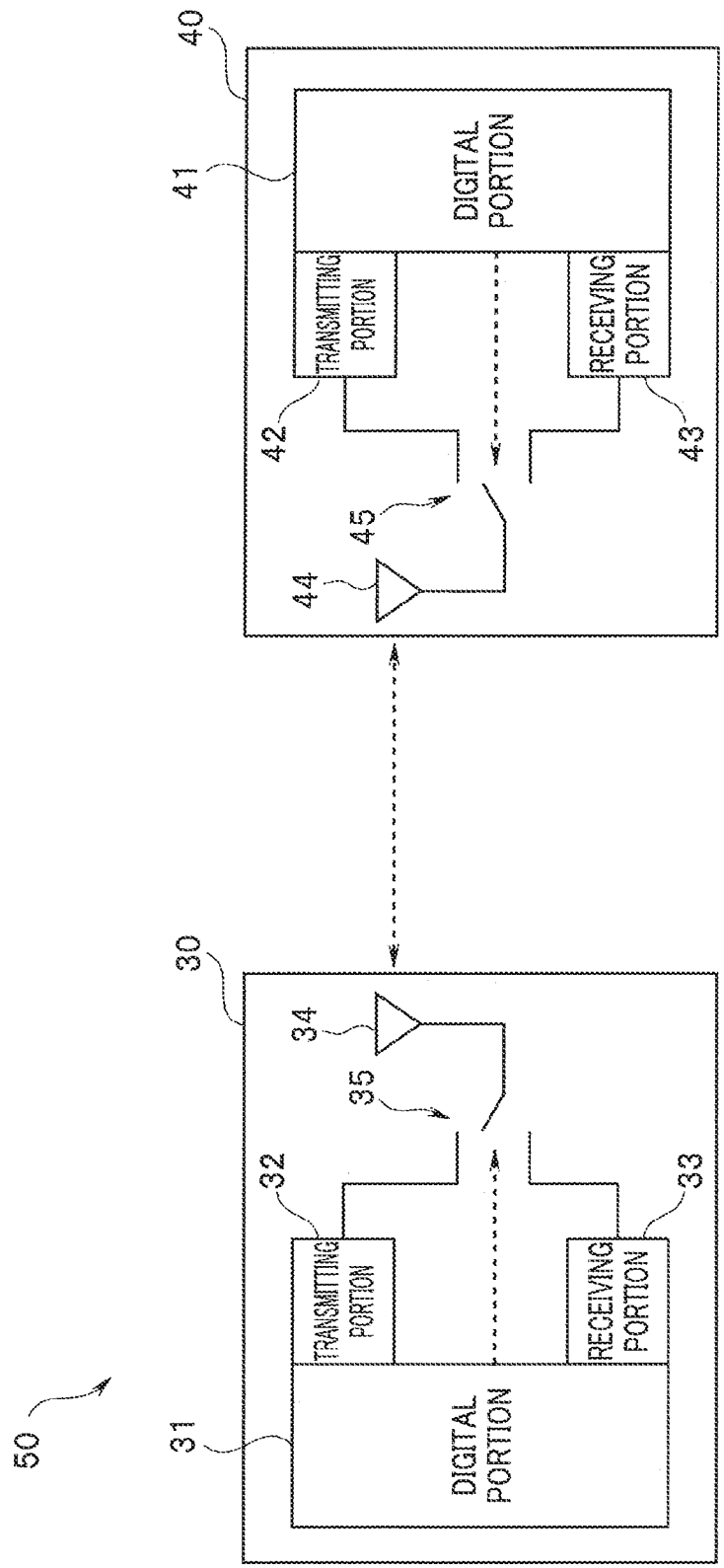
FIG. 2 is an explanatory diagram for illustrating an example of a ranging system that performs communication-type ranging.

FIG. 2 is an explanatory diagram for illustrating an example of a ranging system that performs the communication-type ranging. The ranging system of FIG. 2 measures a distance between an apparatus 30 and an apparatus 40 by communication between the ranging apparatus 30 and the ranging apparatus 40.

The apparatus 30 and the apparatus 40 have the same configuration. The apparatus 30 is provided with a transmitting portion 32 and a receiving portion 33. The transmitting portion 32 generates a CW used for ranging (hereinafter also referred to as a ranging signal). The ranging signal from the transmitting portion 32 is supplied to an antenna 34 via a switch 35 and transmitted to the apparatus 40. A ranging signal from the apparatus 40 arrives at the antenna 34 of the apparatus 30. The ranging signal is supplied to the receiving portion 33 via the switch 35 and received by the receiving portion 33.

Note that a transmitting portion 42, a receiving portion 43, an antenna 44 and a switch 45 of the apparatus 40 have similar configurations of the transmitting portion 32, the receiving portion 33, the antenna 34 and the switch 35 of the apparatus 30, respectively. Thereby, a ranging signal from the apparatus 30 is received by the apparatus 40, and a ranging signal from the apparatus 40 is received by the apparatus 30.

Digital portions 31 and 41 have similar configurations and control each portion of the apparatus 30 and the apparatus 40, respectively. In other words, the digital portion 31 causes the transmitting portion 32 to generate a ranging signal to be transmitted to the apparatus 40 and causes the receiving portion 33 to receive a ranging signal from the apparatus 40. Similarly, the digital portion 41 causes the transmitting portion 42 to generate a ranging signal to be transmitted to the apparatus 30 and causes the receiving portion 43 to receive a ranging signal from the apparatus 30.

(Example of Ranging Operation)

Next, an example of ranging operation will be described, using a method described in Patent Literature 2.

The apparatus 30 and the apparatus 40 mutually transmit and receive ranging signals (CWs) which are unmodulated carriers with a frequency $f_L$, and mutually transmit and receive ranging signals (CWs) which are unmodulated carriers with a frequency $f_H$. Using angular frequencies $\omega_K$ and $\omega_C$ of oscillation signals generated by oscillators of the apparatuses 30 and 40, the oscillators not being shown, frequencies are expressed as $2\pi f_L = \omega_C - \omega_B$ and $2\pi f_H = \omega_C + \omega_B$. The frequencies of the oscillation signals of the oscillators of the apparatuses 30 and 40 are strictly not the same, the oscillators not being shown. In consideration of the disposition, it is assumed that the apparatus 30 transmits transmission signals of two waves, a transmission signal with an angular frequency of $\omega_{C1}+\omega_{B1}$ and a transmission signal with an angular frequency of $\omega_{C1}-\omega_{B1}$. Similarly, it is assumed that the apparatus 40 transmits transmission signals of two waves, a transmission signal with an angular frequency of $\omega_{C2}+\omega_{B2}$ and a transmission signal with an angular frequency of $\omega_{C2}-\omega_{B2}$. The apparatuses 30 and 40 receive mutual transmission signals.

Further, it is assumed that an initial phase of an oscillation signal with an angular frequency of $\omega_{C1}$ and an initial phase of an oscillation signal with a frequency of $\omega_{B1}$ of the apparatus 30 are $\theta_{C1}$ and $\theta_{B1}$, respectively, and it is assumed that an initial phase of an oscillation signal with an angular frequency of $\omega_{C2}$ and an initial phase of an oscillation signal with a frequency of $\omega_{B2}$ of the apparatus 40 are $\theta_{C2}$ and $\theta_{B2}$, respectively.

An amount of phase shift that occurs before the transmission signal with the angular frequency $\omega_{C1}+\omega_{B1}$, among transmission signals transmitted from the apparatus 30 to the apparatus 40, is received by the apparatus 40 after a delay $\tau_1$ is indicated by $\theta_{H1}(t)$, and an amount of phase shift that occurs before the transmission signal with the angular frequency $\omega_{C1}-\omega_{B1}$ is received by the apparatus 40 is indicated by $\theta_{L1}(t)$.

Similarly, an amount of phase shift that occurs before the transmission signal with the angular frequency $\omega_{C2}+\omega_{B2}$, among transmission signals transmitted from the apparatus 40 to the apparatus 30, is received by the apparatus 30 after a delay $\tau_2$ is indicated by $\theta_{H2}(t)$, and an amount of phase shift that occurs before the transmission signal with the angular frequency $\omega_{C2}+\omega_{B2}$ is received by the apparatus 30 is indicated by $\theta_{L2}(t)$.

It is shown in Patent Literature 2 that, in this case, Equation (1) below is satisfied:

$$\{\theta_{H1}(t)-\theta_{L1}(t)\}+\{\theta_{H2}(t)-\theta_{L2}(t)\}=(\theta_{\tau H1}-\theta_{\tau L1})+(\theta_{\tau H2}-\theta_{\tau L2}) \quad (1)$$

Here, the following are assumed:

$$\theta_{\tau H1}=(\omega_{C1}+\omega_{B1})\tau_1 \quad (2)$$

$$\theta_{\tau H2}=(\omega_{C2}+\omega_{B2})\tau_2 \quad (3)$$

$$\theta_{\tau L1}=(\omega_{C1}-\omega_{B1})\tau_1 \quad (4)$$

$$\theta_{\tau L2}=(\omega_{C2}-\omega_{B2})\tau_2 \quad (5)$$

Since the radio wave delays $\tau_1$ and $\tau_2$ between the apparatuses 30 and 40 are the same regardless of a traveling direction, Equation (6) is obtained from Equation (1).

$$\{\theta_{H1}(t)-\theta_{L1}(t)\}+\{\theta_{H2}(t)-\theta_{L2}(t)\}=(\theta_{\tau H1}-\theta_{\tau L1})+(\theta_{\tau H2}-\theta_{\tau L2})=2\times(\omega_{B1}+\omega_{B2})\tau_1 \quad (6)$$

When a radio wave speed is indicated by c; a distance between the apparatuses 30 and 40 is indicated by R; and delay time is indicated by $\tau$, $\tau=R/c$ is obtained. By substituting $\tau=R/c$ for Equation (6), Equation (7) below is obtained.

$$(\tfrac{1}{2})\times\{((\theta_{\tau H1}-\theta_{\tau L1})+(\theta_{\tau H2}-\theta_{\tau L2})\}=(\omega_{B1}+\omega_{B2})\times(R/c) \quad (7)$$

From Equation (7), it is seen that the distance R between the apparatuses 30 and 40 can be calculated by the angular frequencies $\omega_{B1}$ and $\omega_{B2}$, and a result of addition of a phase difference determined from the two frequency waves received by the apparatus 30 and a phase difference determined from the two frequency waves received by the apparatus 40.

Note that Equation (7) above is an example in a case where transmitting and receiving processes are simultaneously performed on the apparatuses 30 and 40. However, frequency bands where simultaneous transmitting and receiving cannot be performed exist due to provisions of Japanese Radio Law. Therefore, Patent Literature 2 discloses an example compatible with a case of time-series transmitting and receiving.

Figure 3:
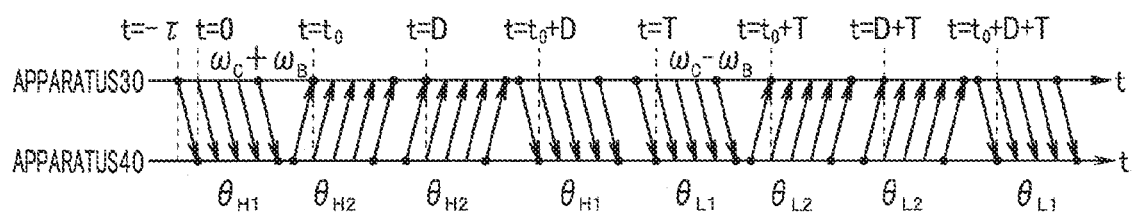
FIG. 3 is an explanatory diagram showing an example of transmission signals of apparatuses 30 and 40.

FIG. 3 is an explanatory diagram showing an example of transmission signals of the apparatuses 30 and 40 in this case by arrows. In a sequence shown in FIG. 3, Equation (8) below holds. Here, t0, D and T indicate delay times shown in FIG. 3.

$$\theta_{H1}(t)+\theta_{H2}(t+t_0)+\theta_{H1}(t+t_0+D)+\theta_{H2}(t+D)-\{\theta_{L1}(t+T)+\theta_{L2}(t+t_0+T)+\theta_{L1}(t+t_0+D+T)+\theta_{L2}(t+D+T)\}=2\{(\theta_{\tau H1}-\theta_{\tau L1})+(\theta_{\tau H2}-\theta_{\tau L2})\}=4\times(\omega_{B1}+\omega_{B2})\tau_1 \quad (8)$$

In other words, in the sequence of FIG. 3, the apparatus 30 transmits a transmission wave with the angular frequency $\omega_{C1}+\omega_{B1}$ (hereinafter referred to as a transmission wave H1A) at a predetermined timing. Immediately after receiving the transmission wave H1A, the apparatus 40 transmits a transmission wave with the angular frequency $\omega_{C2}+\omega_{B2}$ (hereinafter referred to as a transmission wave H2A). Furthermore, after transmitting the transmission wave H2A, the apparatus 40 transmits a transmission wave with the angular frequency $\omega_{C2}+\omega_{B2}$ (hereinafter referred to as a transmission wave H2B) again. After receiving the transmission wave H2B for the second time, the apparatus 30 transmits a transmission wave with the angular frequency $\omega_{C1}+\omega_{B1}$ (hereinafter referred to as a transmission wave HIB) again.

Furthermore, the apparatus 30 transmits a transmission wave with the angular frequency $\omega_{C1}-\omega_{B1}$ (hereinafter referred to as a transmission wave L1A). Immediately after receiving the transmission wave L1A, the apparatus 40 transmits a transmission wave with the angular frequency $\omega_{C2}-\omega_{B2}$ (hereinafter referred to as a transmission wave L2A). Furthermore, after transmitting the transmission wave L2A, the apparatus 40 transmits a transmission wave with the angular frequency $\omega_{C2}-\omega_{B2}$ (hereinafter referred to as a transmission wave L2B) again. After receiving the transmission wave L2B for the second time, the apparatus 30 transmits a transmission wave with the angular frequency $\omega_{C1}-\omega_{B1}$ (hereinafter referred to as a transmission wave L1B) again.

Thus, as shown in FIG. 3, the apparatus 40 acquires a phase $\theta_{H1}(t)$ based on the transmission wave H1A during a predetermined time from predetermined reference time 0, acquires a phase $\theta_{H1}(t+t_0+D)$ based on the transmission wave H1B during a predetermined time from time $t_0+D$, acquires a phase $\theta_{L1}(t+T)$ based on the transmission wave L1A during a predetermined time from time T, and acquires a phase $\theta_{L1}(t+t_0+D+T)$ based on the transmission wave L1B during a predetermined time from time $t_0+D+T$.

Further, the apparatus 30 acquires a phase $\theta_{H2}(t+t_0)$ based on the transmission wave H2A during a predetermined time from time to, acquires a phase $\theta_{H2}(t+D)$ based on the transmission wave H2B during a predetermined time from time D, acquires a phase $\theta_{L2}(t+t_0+T)$ based on the transmission wave L2A during a predetermined time from time $t_0+T$, and acquires a phase $\theta_{L2}(t+D+T)$ based on the transmission wave L2B during a predetermined time from time D+T.

At least one of the apparatuses 30 and 40 transmits phase information, that is, the determined four phases, the two phase differences, or an operation result of Equation (8) above about the phase differences to the other apparatus. A controlling portion of the apparatus 30 or 40 that receives the phase information calculates a distance by operation of Equation (8) above.

(Configuration)

FIG. 1 shows an example of a specific configuration of the apparatus 30 (or 40) of FIG. 2. A transmitting/receiving circuit 20 corresponds to the transmitting portion 32 or 42 and the receiving portion 33 or 43 of FIG. 2. In FIG. 1, the digital portion 31 or 41 of FIG. 2 is configured with a controlling portion 11, a transmission data processing portion 12, a ranging signal transmitting processing portion 13, a receive data processing portion 14, a ranging processing portion 15 and switches 16 and 17.

The controlling portion 11 controls each portion of the ranging apparatus of FIG. 1. The controlling portion 11 may be configured with a processor using a CPU (central processing unit), an FPGA (field programmable gate array) and the like, may operate in accordance with a program stored in a memory not shown to control each portion, or may realize a part or all of functions by a hardware electronic circuit.

The transmission data processing portion 12 and the receive data processing portion 14 are configured with a transmission data processing circuit and a receive data processing circuit for data communication, respectively, and the ranging signal transmitting processing portion 13 and the ranging processing portion 15 are configured with a ranging signal transmitting processing circuit and a ranging processing circuit for ranging, respectively. The transmitting/receiving circuit 20 is a circuit shared by data communication and ranging.

An output of the transmission data processing portion 12 and an output of the ranging signal transmitting processing portion 13 are supplied to the transmitting/receiving circuit 20 via the switch 16. The switch 16 is controlled by the controlling portion 11 to selectively provide the output of the transmission data processing portion 12 or the output of the ranging signal transmitting processing portion 13 to the transmitting/receiving circuit 20.

The transmission data processing portion 12 is controlled by the controlling portion 11 to generate transmission data and output the transmission data to the switch 16. At the time of data communication, the switch 16 selects the output of the transmission data processing portion 12 and outputs the output to the transmitting/receiving circuit 20.

The transmitting/receiving circuit 20 performs a process for generating a transmission signal by FSK modulation and FSK-modulating a receive signal to generate a baseband signal. In other words, a data generator 21 of the transmitting/receiving circuit 20 is provided with transmission data via the switch 16. The data generator 21 generates data for FSK modulation based on the transmission data and outputs the data to an oscillator 22. The oscillator 22 causes an oscillation frequency to change according to the inputted data.

In this way, the transmission data is FSK-modulated, and a transmission signal is obtained from the oscillator 22. Note that the oscillator 22 is capable of generating transmission signals with a plurality of frequencies corresponding to a plurality of channels. The controlling portion 11 is adapted to be capable of controlling the frequencies (the channels) of the transmission signals generated by the oscillator 22.

An output of the oscillator 22 is provided to a power amplifier 23. The power amplifier 23 amplifies a transmission signal and outputs the transmission signal to an antenna 25 via a switch 24. The switch 24 is controlled by the controlling portion 11 to connect the power amplifier 23 and the antenna 25 at the time of transmitting, and to connect the antenna 25 and a receiving processing portion 26 at the time of receiving. Thus, at the time of transmitting, the antenna 25 transmits a transmission signal from the power amplifier 23.

At the time of receiving, the antenna 25 receives a receive signal and provides the receive signal to the receiving processing portion 26 via the switch 24. The receiving processing portion 26 performs FSK demodulation processing for the receive signal and outputs a demodulated signal.

The demodulated signal from the receiving processing portion 26 of the transmitting/receiving circuit 20 is supplied to the switch 17. The switch 17 is controlled by the controlling portion 11 to provide the output of the receiving processing portion 26 selectively to the receive data processing portion 14 or the ranging processing portion 15. At the time of data communication, the switch 17 outputs a receive signal from the receiving processing portion 26 to the receive data processing portion 14. The receive data processing portion 14 restores receive data from the inputted receive signal.

In the present embodiment, the ranging signal transmitting processing portion 13 is controlled by the controlling portion 11 to generate a signal for outputting the ranging signals of the two frequency waves described above. In the present embodiment, in consideration of transmission by an FSK modulation scheme, for example, the ranging signal transmitting processing portion 13 continuously generates and outputs a high level ("H") corresponding to a logical value "1". Note that the continuation of "1" or "H" will be referred to as "continuous 1s" in description below.

At the time of ranging, the controlling portion 11 causes the switch 16 to select an output of the ranging signal transmitting processing portion 13 and causes an output of the receiving processing portion 26 to be supplied to the ranging processing portion 15 by the switch 17. The continuous 1s from the ranging signal transmitting processing portion 13 are provided to the data generator 21 via the switch 16. An operation of the transmitting/receiving circuit 20 at the time of ranging is similar to the operation at the time of data communication. When the continuous 1s are inputted, the data generator 21 causes an oscillation output with a frequency corresponding to the continuous 1s to be outputted from the oscillator 22.

In other words, at the time of ranging, a transmission signal of the oscillator 22 is a CW which is an unmodulated carrier. For example, when the continuous 1s are inputted to the transmitting/receiving circuit 20 in a case where frequency deviation for the logical value "1" is set to 200 kHz, a CW with a frequency corresponding to a center frequency of a predetermined transmission channel plus 200 kHz is outputted from the oscillator 22. Note that a transmission channel for a transmission signal from the oscillator 22 is set by the controlling portion 11.

It is conceivable to, using the method of causing a first wave to be generated, corresponding to continuous 1s, also cause a second wave to be generated, corresponding to continuous 1s. For example, two CWs each of which corresponds to continuous 1s are caused to be generated, using two transmission channels.

In the case of ranging using two waves, a measurable distance is {light velocity $c/(f_H-f_L)$}×($\frac{1}{2}$). In the case of causing two CWs to be generated using two channels, the measurable distance is restricted by a channel spacing. For example, if the channel spacing between transmission channels is 3 MHz, a ranging result repeats at a distance of about 50 m, and, therefore, the measurable distance is about 50 m.

Therefore, in the present embodiment, control is performed so that ranging signals of two waves are caused to be generated in the same channel. In other words, the controlling portion 11 controls the ranging signal transmitting processing portion 13 to generate continuous 1s, and continuously generates and outputs a low-level ("L") signal corresponding to a logical value "0". Note that continuation of "0" or "L" will be referred to as "continuous 0s".

When the continuous 0s are inputted, the data generator 21 causes an oscillation output with a frequency corresponding to the logical value "0" to be outputted from the oscillator 22. In other words, a transmission signal from the oscillator 22 in this case is also a CW which is an unmodulated carrier. For example, when the continuous 0s are inputted to the transmitting/receiving circuit 20 in a case where frequency deviation for the logical value "0" is set to −200 kHz, a CW with a frequency corresponding to a center frequency of a predetermined transmission channel minus 200 kHz is outputted from the oscillator 22.

In the present embodiment, control is performed so that, for example, a CW generated in a predetermined channel corresponding to continuous 1s is used as the first wave between two waves of ranging signals, and, for example, a CW generated in the same channel as the first wave corresponding to continuous 0s is used as the second wave.

At the time of ranging, the controlling portion 11 causes the switch 16 to select an output of the ranging signal transmitting processing portion 13 and causes an output of the receiving processing portion 26 to be supplied to the ranging processing portion 15 by the switch 17. The continuous 1s or continuous 0s from the ranging signal transmitting processing portion 13 are provided to the data generator 21 via the switch 16. An operation of the transmitting/receiving circuit 20 at the time of ranging is similar to the operation at the time of data communication. The data generator 21 causes an oscillation output with a frequency corresponding to the continuous 1s to be outputted from the oscillator 22 when the continuous 1s are inputted, and causes an oscillation output with a frequency corresponding to the continuous 0s to be outputted from the oscillator 22 when the continuous 0s are inputted. In other words, a transmission signal of the oscillator 22 is a CW which is an unmodulated carrier at the time of ranging, and a difference between transmission signal frequencies of the two waves corresponds to amounts of frequency deviation set corresponding to the logical values "1" and "0".

For example, when the continuous 1s are inputted to the transmitting/receiving circuit 20 in the case where frequency deviation for the logical value "1" is set to 200 kHz, a CW with a frequency corresponding to a center frequency of a predetermined transmission channel plus 200 kHz is outputted from the oscillator 22. In the present embodiment, the CW in this case is used as a signal with the frequency $f_H$ between the two waves of the ranging signals described above.

Further, in the present embodiment, a configuration is made in which, in the case where frequency deviation for the logical value "0" is set to −200 kHz, and the continuous 0s are inputted to the transmitting/receiving circuit 20, a CW with a frequency corresponding to a center frequency of a transmission channel with the frequency $f_H$ minus 200 kHz is outputted from the oscillator 22. In the present embodiment, the CW in this case is used as a signal with the frequency $f_L$ between the two waves of the ranging signals described above.

Figure 4:
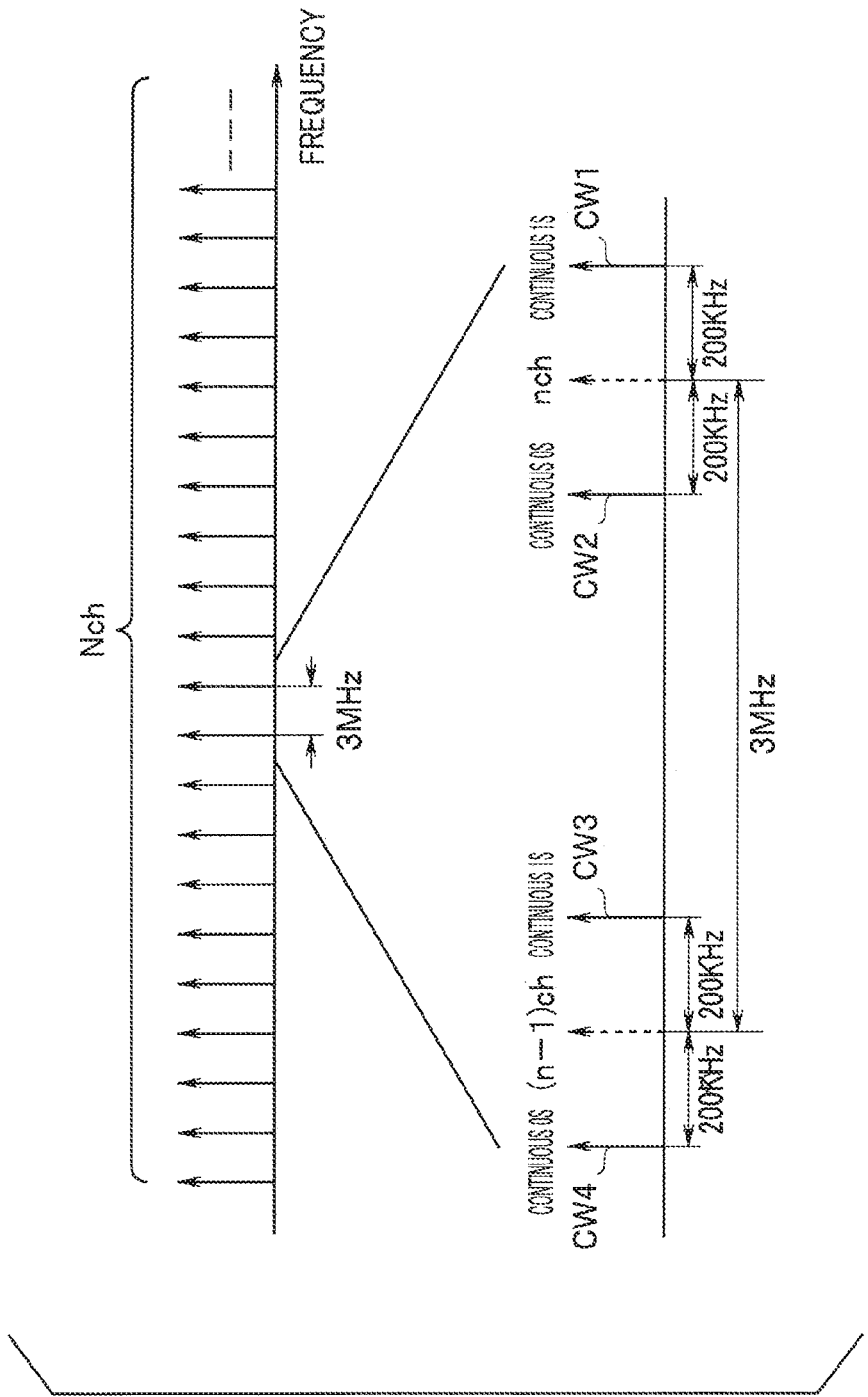
FIG. 4 is an explanatory diagram for illustrating frequency components of a ranging signal.

Next, an operation of the embodiment configured as described above will be described with reference to FIGS. 4 and 5. FIG. 4 is an explanatory diagram for illustrating frequency components of a ranging signal; and FIG. 5 is a flowchart for illustrating the operation of the embodiment.

In FIG. 4, a horizontal axis indicates frequency, transmission bands of N channels (ch) used for data communication are shown, N being a predetermined number, and up arrows indicate center frequencies of the channels. In the present embodiment, data communication and ranging are performed using the N transmission channels shown in FIG. 4. Though FIG. 4 shows an example in which each transmission channel has a 3 MHz band (a channel spacing is 3 MHz), the channel spacing is not specially limited.

In the example of FIG. 4, a band of a predetermined one channel is enlarged and shown at a lower part, and broken up arrows correspond to center frequencies of adjoining two channels. FIG. 4 shows an example in which the oscillator 22 is configured to generate such an oscillation output that frequency deviation corresponding to data "1" is 200 kHz, and frequency deviation corresponding to data "0" is −200 kHz.

Figure 5:
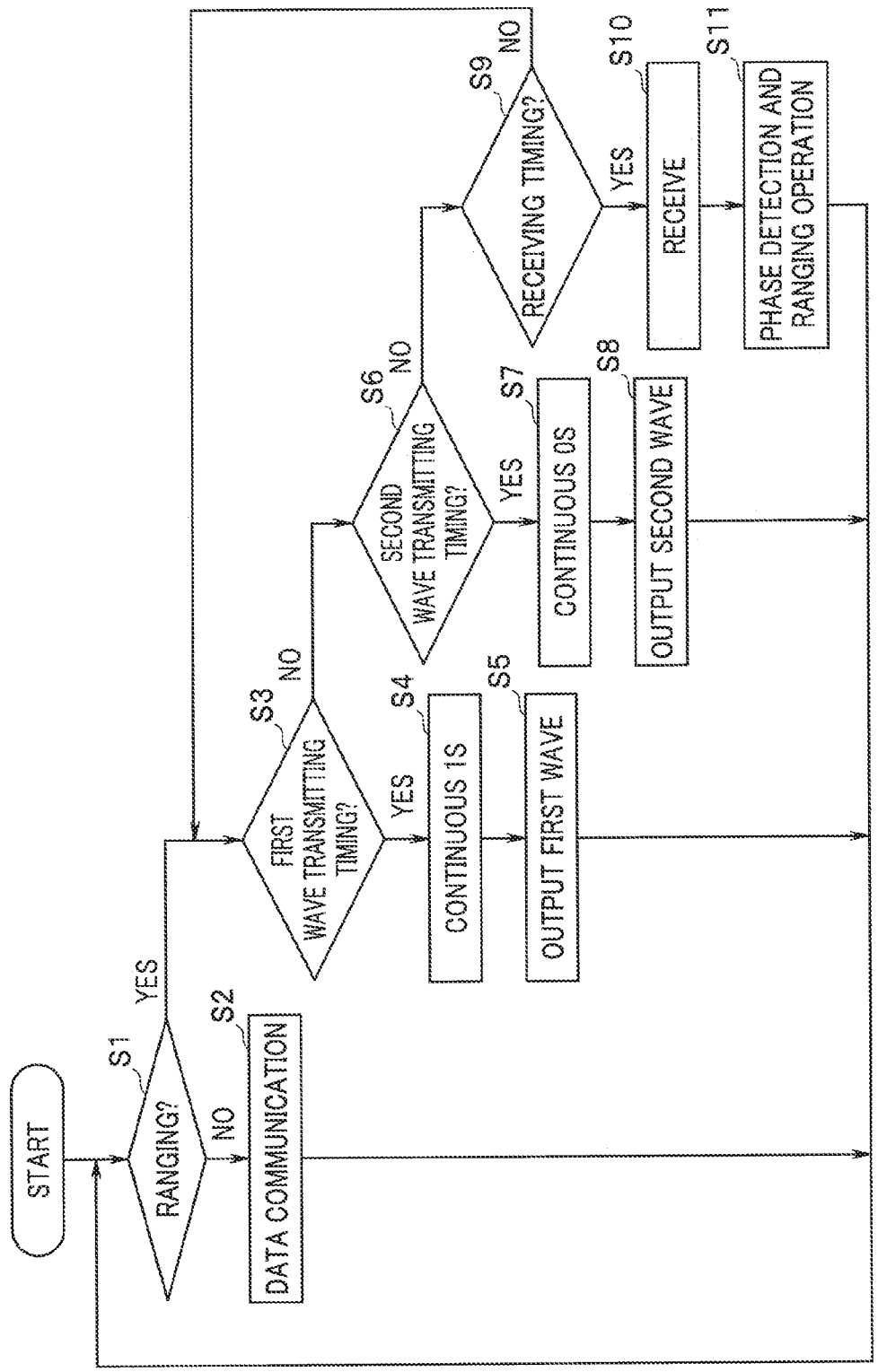
FIG. 5 is a flowchart for illustrating an operation of the embodiment.

The controlling portion 11 judges whether a ranging mode is set or a data communication mode is set, at step S1 of FIG. 5. For example, the controlling portion 11 may be adapted to set the ranging mode or the data communication mode according to a request from a host not shown. For example, the host may specify the ranging mode or the data communication mode according to a user operation.

If judging that the ranging mode is not set, the controlling portion 11 performs a process corresponding to the data communication mode (step S2). In other words, the controlling portion 11 controls the transmission data processing portion 12 and the receive data processing portion 14 to perform data communication. The transmission data processing portion 12 generates transmission data. The transmission data is supplied to the data generator 21 of the transmitting/receiving circuit 20 via the switch 16. The data generator 21 generates data for FSK modulation based on the transmission data and causes the oscillation frequency of the oscillator 22 to change. Thereby, an FSK-modulated signal corresponding to the transmission data is generated from the oscillator 22. After being amplified by the power amplifier 23, the FSK-modulated signal (a transmission signal) from the oscillator 22 is supplied to the antenna 25 via the switch 24 and transmitted.

A receive signal induced in the antenna 25 is supplied to the receiving processing portion 26 via the switch 24. The receiving processing portion 26 FSK-demodulates the receive signal to obtain a demodulated signal. During the data communication mode, the demodulated signal is supplied to the receive data processing portion 14 via the switch 17. Receive data is restored from the inputted receive signal by the receive data processing portion 14. In this way, data transmitting/receiving is performed in the data communication mode.

If judging that the ranging mode is set, the controlling portion 11 causes the process to transition from step S1 to step S3. For example, when desiring to determine a distance between a terminal including the ranging apparatus of FIG. 1 and another apparatus, a user specifies the ranging mode. When the ranging mode is specified, the controlling portion 11 judges whether a first wave transmitting timing has come or not, at step S3. If the judgment is NO, the controlling portion 11 judges whether a second wave transmitting timing has come or not, at step S6. Here, if the judgment is NO, the controlling portion 11 judges whether a receiving timing has come or not, at step S9.

For example, the controlling portion 11 may execute the ranging mode by a predetermined packet in data communication to perform control transmitting and receiving of ranging signals. If detecting that the first wave transmitting timing has come, at step S3, the controlling portion 11 causes the ranging signal transmitting processing portion 13 to generate continuous 1s (step S4).

The continuous 1s from the ranging signal transmitting processing portion 13 are supplied to the data generator 21 via the switch 16. The data generator 21 causes an oscillation output corresponding to the continuous 1s, that is, a CW which is an unmodulated carrier with an oscillation frequency corresponding to a center frequency of a channel plus 200 kHz to be generated from the oscillator 22 as a first wave output (step S5). For example, the data generator 21 causes a ranging signal CW1 with a frequency corresponding to a center frequency of the n-th channel (ch) of FIG. 4 plus 200 kHz to be generated from the oscillator 22 as a first wave. After being amplified by the power amplifier 23, the first wave is supplied to the antenna 25 via the switch 24 and transmitted.

Next, if judging that the first wave transmitting timing has not come, at step S3, the controlling portion 11 judges whether the second wave transmitting timing has come or not, at step S6. If judging that the second wave transmitting timing has come, the controlling portion 11 performs transmitting of a second wave of a ranging signal.

In the present embodiment, the controlling portion 11 causes the ranging signal transmitting processing portion 13 to generate continuous 0s in order to cause the ranging signal of the second wave to be generated in the same channel as the first wave (step S7). The continuous 0s from the ranging signal transmitting processing portion 13 are supplied to the data generator 21 via the switch 16. The data generator 21 causes an oscillation output corresponding to the continuous 0s, that is, a CW which is an unmodulated carrier with an oscillation frequency corresponding to a center frequency of a channel including the first wave minus 200 kHz to be generated from the oscillator 22 as a second wave output (step S5). For example, if the first wave is the ranging signal CW1 of FIG. 4, the data generator 21 causes a ranging signal CW2 with a frequency corresponding to the center frequency of the n-th channel (ch) minus 200 kHz to be generated from the oscillator 22 as the second wave. After being amplified by the power amplifier 23, the second wave is supplied to the antenna 25 via the switch 24 and transmitted.

In this way, the ranging signals of two waves in the same channel are outputted from the transmitting/receiving circuit 20. In the example of FIG. 4, a frequency spacing between CW1 and CW2 which are the ranging signals is 400 kHz. Therefore, since a ranging result repeats at a distance of about 375 m in this case, the measurable distance can be extended to about 375 m. Note that if the ranging signals of two waves are assumed to be CW1 and CW3 in adjoining channels, the measurable distance is only about 50 m as described above.

If judging that the second wave transmitting timing has not come, at step S6, the controlling portion 11 judges whether the receiving timing has come or not, at step S9. If judging that the receiving timing has come, the controlling portion 11 controls the switch 24 to supply a receive signal induced in the antenna 25 to the receiving processing portion 26 and obtains a demodulated signal by FSK demodulation. The ranging processing portion 15 captures the demodulated signal via the switch 17 and detects a phase. The ranging processing portion 15 performs ranging operation for determining a distance between the apparatus of the ranging processing portion 15 and the other apparatus using a result of the phase detection.

Note that, in the case of adopting the method of Patent Literature 2, it is necessary for the apparatus or the other apparatus to transmit a result of phase detection to the counterpart apparatus. The controlling portion 11 may transmit the phase information to the counterpart apparatus, for example, by data communication using the transmission data processing portion 12. Alternatively, the controlling portion 11 may receive the phase information from the counterpart apparatus by data communication.

Thus, in the present embodiment, a configuration is possible in which a transmitting/receiving circuit is shared between a circuit portion for data communication adopting FSK demodulation and a circuit portion for ranging, and it is possible to suppress increase in a circuit scale. Further, in the present embodiment, a plurality of CWs in a band in one channel among transmission channels used for data communication are used for ranging signals, so that ranging for a relatively long distance is possible.

Further, in the present embodiment, CWs of two waves are caused to be generated in one transmission channel. In comparison with a case of causing only one CW to be generated in one transmission channel using only continuous 1s, the number of CWs that can be used for ranging signals can be increased, and it is possible to improve ranging accuracy.

Note that though an apparatus including both of a transmitting device and a receiving device for ranging and data communication is shown in FIG. 1, the transmitting device and the receiving device may be configured as separate bodies. A transmitting device for ranging can be configured with the controlling portion 11, the transmission data processing portion 12, the ranging signal transmitting processing portion 13, the switch 16, the data generator 21, the oscillator 22, the power amplifier 23 and the antenna 25 of FIG. 1. Similarly, a receiving device for ranging can be configured with the controlling portion 11, the receive data processing portion 14, the ranging processing portion 15, the switch 17, the receiving processing portion 26 and the antenna 25 of FIG. 1.

Further, not only the controlling portion 11 but also each of the transmission data processing portion 12, the ranging signal transmitting processing portion 13, the receive data processing portion 14 and the ranging processing portion 15 may be configured with a processor using a CPU, an FPGA and the like, may operate in accordance with a program stored in a memory not shown to control each portion, or may realize a part or all of functions by a hardware electronic circuit.

Though an example of causing ranging signals of two waves to be generated in one transmission channel has been described in the above embodiment, the ranging signals of two waves may be caused to be generated in different transmission channels. For example, CW3 in the (n−1)th channel and CW2 in the n-th channel of FIG. 4 may be the ranging signals of two waves.

In this case, it is possible to extend the measurable distance to some extent.

(Modification)

Figure 6:
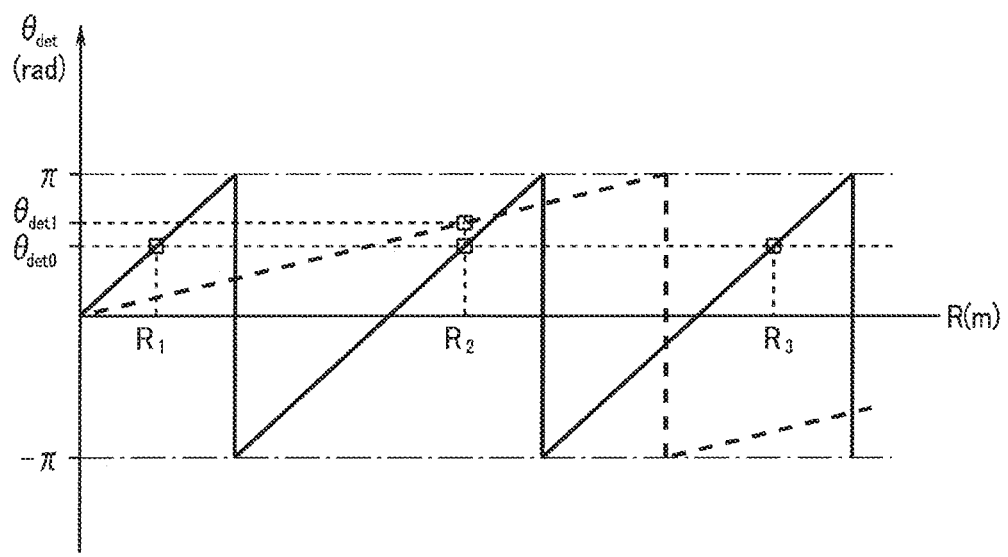
FIG. 6 is an explanatory diagram for illustrating a modification.

FIG. 6 is an explanatory diagram for illustrating a modification. In FIG. 6, a horizontal axis and a vertical axis indicate distance and phase, respectively, and two ranging results are shown.

Since it is not possible to detect a detected phase difference beyond 2π, repeating occurs in a ranging result, and a plurality of distance candidates exist for a calculated detected phase difference. In the above embodiment, CWs (ranging signals) of two waves in the same channel are caused to be generated, and it is possible to lengthen a repeating distance. However, it is thought that ranging accuracy of a range result in the case of using CWs of two waves in the same channel is relatively low. Therefore, in the present modification, the CWs of two waves in the same channel are used only for correction of repeating, and a ranging result is obtained using another set of CWs.

In FIG. 6, a ranging result by a set of CWs of two waves (hereinafter referred to as a CW set for ranging) other than a set of CWs of two waves in the same channel (hereinafter referred to as a CW set for repeating correction) is shown by a solid line. For the CW set for ranging, a transmission channel is selected so that a frequency difference between the two CWs is relatively large. Therefore, in ranging using the CW set for ranging, ranging accuracy is relatively high though a repeating distance is relatively short.

FIG. 6 shows a relationship between a distance R and $\theta_{det}$ when a left side of Equation (7) described above is $\theta_{det}$. A solid line in FIG. 6 shows an example of the case of using the CW set for ranging, and a broken line shows an example of the case of using the CW set for repeating correction. Note that though a sum $\theta_{det}$ of detected phase differences calculated by Equation (7) above can take a value other than values between $-\pi$ (rad) and $\pi$ (rad), a sum $\theta_{det}$ of detected phase differences shown in FIG. 6 has been converted to be between $-\pi$ (rad) and $\pi$ (rad). This is because a phase angle is generally indicated within a range of $[-\pi$ (rad), $\pi$ (rad)].

As shown by the solid line in FIG. 6, since a distance change relative to a change in a sum $\theta_{det}$ of detected phase differences is small when the CW set for ranging is used, it is seen that high ranging accuracy can be obtained. If a sum $\theta_{det0}$ of detected phase differences is obtained in the case of using the CW set for ranging, $R_1$, $R_2$ and $R_3$ exist as candidates for a distance of a ranging result, as shown in FIG. 6.

A relationship between a sum of detected phase differences obtained using the CW set for repeating correction and a distance is shown by a broken line in FIG. 6. The broken line in FIG. 6 shows that a repeating distance is relatively long. In order to select a correct distance as a ranging result from among $R_1$, $R_2$ and $R_3$, a distance close to a distance obtained from the sum of the detected phase differences obtained using the CW set for repeating correction from among the distances may be selected. For example, if $\theta_{det1}$ is detected using the CW set for repeating correction, it can be judged that the distance $R_2$ obtained using the CW set for ranging is the correct ranging result. Thus, a set of CWs of two waves in the same channel is used for repeating correction of a ranging result.

Note that though an example in which only one set is used as the CW set for ranging is shown in FIG. 6, a plurality of sets may be used. Further, as the CW set for ranging, a set of a CW of a predetermined channel corresponding to continuous 1s and a CW of another channel corresponding to continuous 0s may be adopted, or a set of CWs of mutually different channels, both of CWs corresponding to continuous 1s or continuous 0s may be adopted.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A ranging apparatus adopting communication type ranging by a phase detection scheme, the ranging apparatus comprising:
   a transmitting circuit configured to enable transmission using a plurality of carriers in data communication in which a carrier frequency spacing is set to a frequency spacing specified by a data communication scheme and configured to transmit a transmission signal obtained by modulating transmission data; and
   a control circuit configured to control the transmission circuit to cause a plurality of continuous waves each having a frequency that deviates from a center frequency of the carriers by a mutually different frequency deviation amount smaller than the carrier frequency spacing to be generated as continuous waves used for ranging by the phase detection scheme,
   wherein the transmitting circuit obtains the transmission signal by FSK modulation, the ranging apparatus further comprises a ranging signal transmitting processing circuit configured to generate continuous 1s and continuous 0s as the transmission data and provide the continuous 1s and the continuous 0s to the transmitting circuit, and in a ranging mode, the control circuit causes the ranging signal transmitting processing circuit to generate the continuous 1s and the continuous 0s and supply the continuous 1s and the continuous 0s to the transmitting circuit to cause the plurality of continuous waves to be generated, and
   wherein the control circuit is further configured to generate the mutually different frequency deviations such that that frequency deviation corresponding to data representing at least one 1 of the continuous 1 s is a positive deviation, and frequency deviation corresponding to data representing at least one 0 of the continuous 0s is a negative deviation.

2. The ranging apparatus according to claim 1, wherein the ranging signal transmitting processing circuit provides the continuous 1s and the continuous 0s to the transmitting circuit in time division, and the transmitting circuit generates a continuous wave based on the continuous 1 s and a continuous wave based on the continuous 0s in time division.

3. A ranging system comprising
   a plurality of ranging apparatuses with a same configuration as a configuration of the ranging apparatus according to claim 1, wherein
   the plurality of continuous waves are transmitted and received among the plurality of ranging apparatuses to obtain a ranging result.

4. The ranging system according to claim 3, wherein repeating of a ranging result obtained by causing a plurality of continuous waves each having a frequency that deviates from respective center frequencies of the plurality of carriers by a mutually different frequency deviation amount smaller than a carrier frequency spacing to be generated and transmitting and receiving the plurality of continuous waves among the plurality of ranging apparatuses is corrected using the ranging result obtained by transmitting and receiving the plurality of continuous waves among the plurality of ranging apparatuses.

5. A ranging method adopting communication type ranging by a phase detection scheme, the ranging method comprising:
- generating continuous 1s and continuous 0s as transmission data;
- providing the continuous 1s and the continuous 0s to a transmitting circuit configured to FSK-modulate transmission data to transmit a transmission signal to cause a plurality of continuous waves each having a frequency that deviates from a center frequency of carriers used for data communication by a mutually different frequency deviation amount smaller than a carrier frequency spacing to be generated as transmission signals for ranging; and
- generating the mutually different frequency deviations such that that frequency deviation corresponding to data representing at least one 1 of the continuous 1 s is a positive deviation, and frequency deviation corresponding to data representing at least one 0 of the continuous 0s is a negative deviation.

* * * * *